Sept. 8, 1925.

T. J. MURPHY

MOTOR APPARATUS

Filed April 3, 1922

INVENTOR.
Thomas J. Murphy.
BY
his ATTORNEY.

Sept. 8, 1925.  
T. J. MURPHY  
MOTOR APPARATUS  
Filed April 3, 1922  
1,553,259  
4 Sheets-Sheet 2

INVENTOR.  
Thomas J. Murphy.  
BY Frederick B. Lynch  
his ATTORNEY.

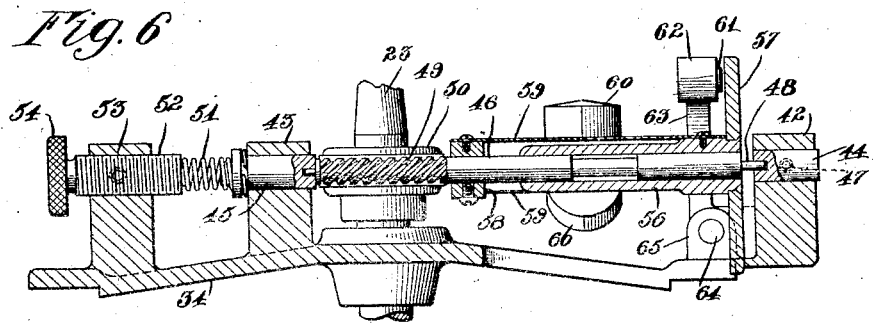
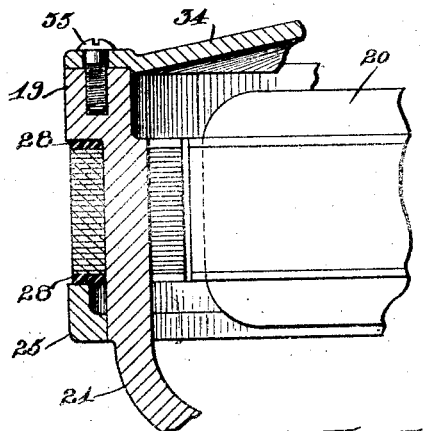
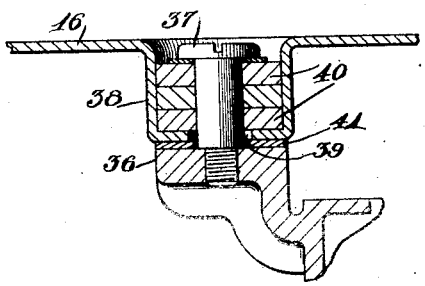
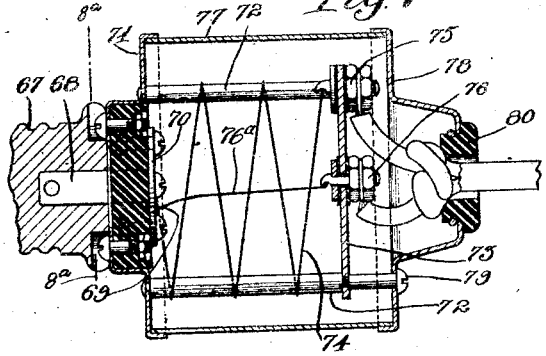

Sept. 8, 1925.  T. J. MURPHY  1,553,259
MOTOR APPARATUS
Filed April 3, 1922  4 Sheets-Sheet 4
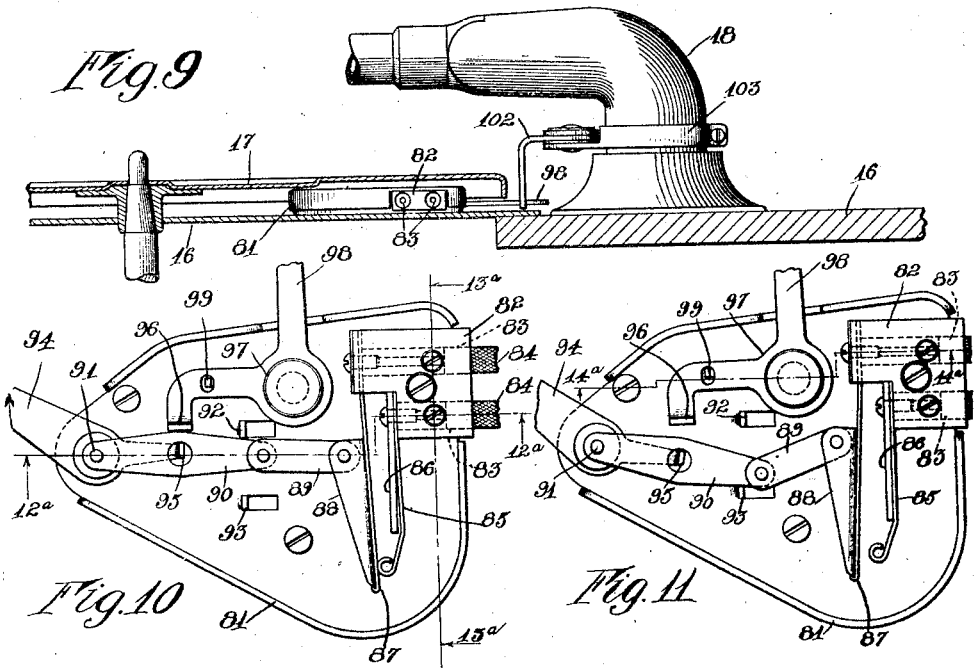
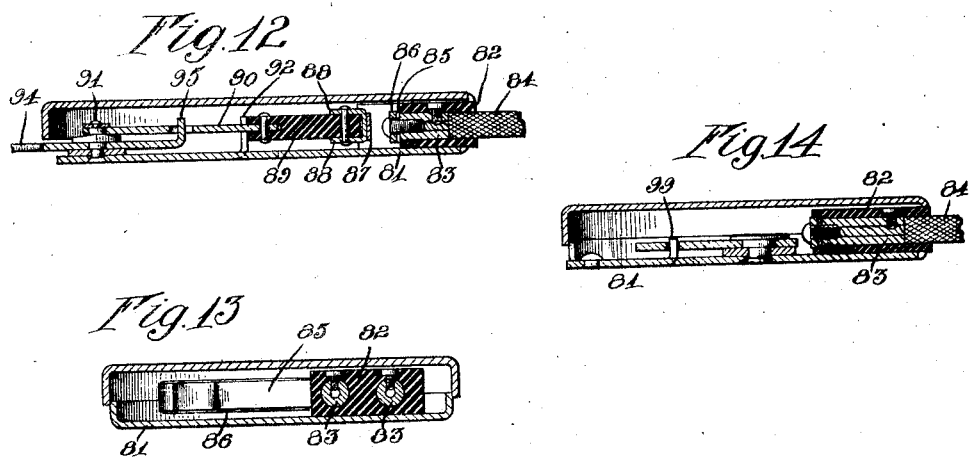
INVENTOR.
Thomas J Murphy.
BY
his ATTORNEY.

Patented Sept. 8, 1925.

1,553,259

UNITED STATES PATENT OFFICE.

THOMAS J. MURPHY, OF ASTORIA, NEW YORK, ASSIGNOR OF ONE-HALF TO JAMES P. B. DUFFY, OF ROCHESTER, NEW YORK.

MOTOR APPARATUS.

Application filed April 3, 1922. Serial No. 548,931.

*To all whom it may concern:*

Be it known that I, THOMAS J. MURPHY, of Astoria, in the county of Queens and State of New York, have invented certain new and useful Improvements in Motor Apparatus; and I do hereby declare the following to be a full, clear, and exact description of the same, reference being had to the accompanying drawings, forming a part of this specification, and to the reference numerals marked thereon.

This invention relates to motor apparatus and more especially to the variety adapted for actuating machines of comparatively small size, such, for example, as sound reproducing machines, the chief object of the invention being to provide apparatus of this character capable of operating with a high degree of uniformity in speed and substantially without hum or vibration, together with advantageous controlling and speed governing devices. To these and other ends the invention resides in certain improvements and combinations of parts all as will hereinafter be more fully described, the novel features being pointed out in the claims at the end of the specification.

In the drawings:

Figure 4 is a fragmentary sectional view on the line 4ª—4ª of Figure 2 showing a part of the motor construction;

Figure 5 is a section on the line 5ª—5ª of Figure 1 illustrating the attachment of the motor to the cabinet;

Figure 7 is a sectional view on the line 7ª—7ª of Figure 1 showing a current regulating device;

Figure 8 is a section on the line 8ª—8ª of Figure 7;

Figure 9 is a section on the line 9ª—9ª of Figure 1 showing a stop mechanism;

Figures 10 and 11 are plan views of the stop mechanism with the parts in different positions;

Figure 12 is a section on the line 12ª—12ª of Figure 10;

Figure 13 is a section on the line 13ª—13ª of Figure 10; and

Figure 14 is a section on the line 14ª—14ª of Figure 11.

Similar reference numerals throughout the several views indicate the same parts.

Figure 3:
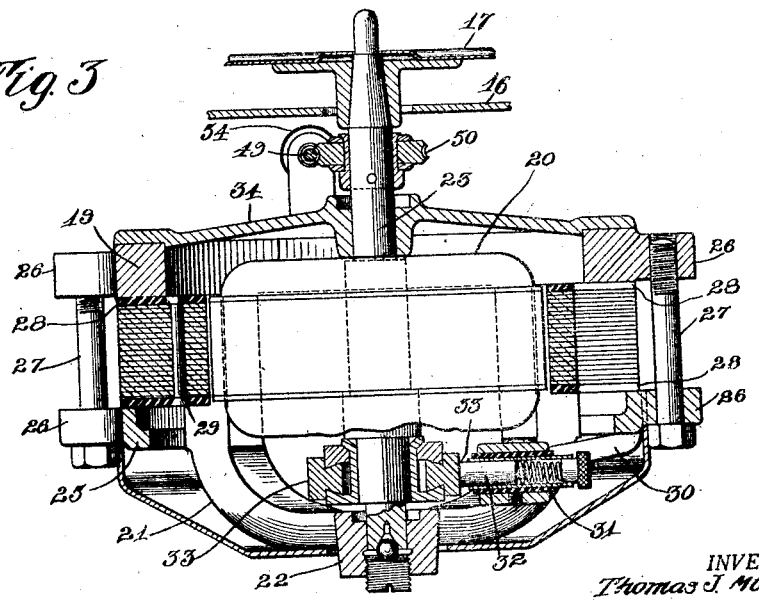
Figure 3 is a section on the line 3ª—3ª of Figure 2 showing the record table and cabinet top in section.

The embodiment of the invention selected for the purposes of the present disclosure, to illustrate the principles involved and a preferred practical application of the same, shows the invention as applied for driving and controlling a sound reproducing machine. The latter is represented in the drawings as of the usual or any suitable variety comprising a cabinet 15, Figure 1, having a top or bed 16 shown in the present instance as partly of wood and partly metal. The motor of the present invention is preferably supported on the under side of the cabinet top, as shown in Figures 3 and 5, with one end of its armature shaft extending through an opening in the cabinet top, for supporting and directly actuating or rotating the record table 17. At one side of the latter, as usual, there is supported on the cabinet top a tone arm 18 having a swinging movement back and forth across the record table to reproduce the record in the usual manner.

The electric motor for driving the machine embodies a simple, compact and rigid form of construction which is also economical to manufacture and assemble. It is preferably of the four (4) pole, series wound type operating on either alternating or direct current and has a supporting frame comprising a substantially ring shaped part or yoke 19 surrounding the rotary armature 20 adjacent one of its ends. This yoke is in the present instance formed as a casting with integral elements or ribs 21 extending longitudinally of the armature to enclose the same and converging at their opposite ends for union in a bearing 22 carrying one end of the armature shaft 23. The laminated field core more particularly described hereinafter is carried on yoke 19 and its ribs 21, having the general shape indicated at 24, Figure 2. The field core is assembled as a unit and located as described with reference to yoke 19 and its ribs and clamped in position by means of a second ring shaped part, or yoke, 25, fitted over the frame ribs 21 as shown.

Yokes 19 and 25 have a plurality of outwardly extending aligned pairs of lugs 26. These lugs are formed with bolt openings one of which in each pair is threaded to receive a bolt 27 for drawing the yokes together in clamping engagement with opposite sides of the core to compress and clamp the same rigidly in place.

Figure 2:
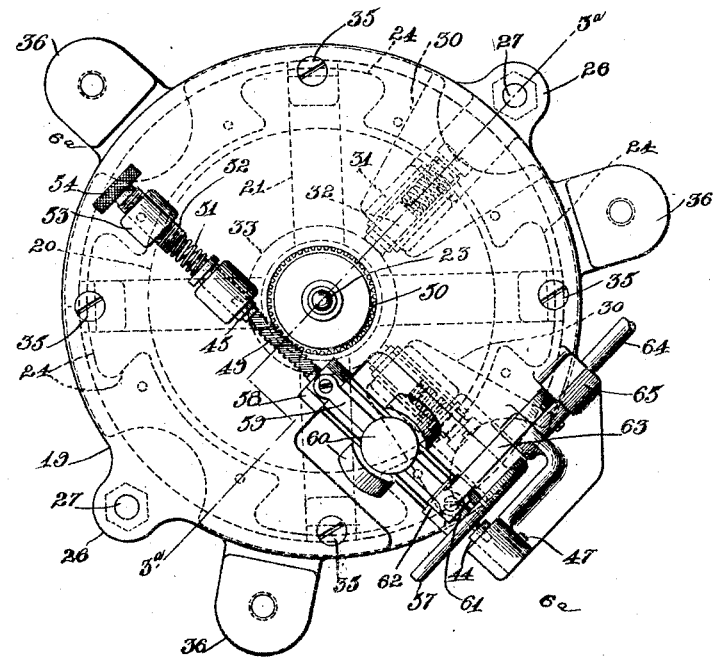
Figure 2 is a top plan view of the driving motor and associate parts.

The field core comprises a plurality of laminations as usual having the shape indicated in Figure 2, and is provided on either side with supporting and insulating plates 28 of fiber or similar material having the same general shape as the laminations. As shown, these plates insulate the core from the frame and back up and support the laminations, particularly at the poles, when the core is clamped in the frame. It has been found that the laminated core may be rendered considerably more rigid by perforating the laminations and their external binding plates at the pole tips, and inserting a rivet 29 therethrough which is headed with the core under compression during the assembly of the latter as a unit. This rivet is preferably of the tubular variety and binds the laminations rigidly together at the pole tips. The clamping of the laminated core between the yokes 19 and 25 and the riveting of the pole tips as described serves effectively to prevent hum and vibration in the field, thus overcoming an objectionable characteristic common to such motors.

The clamping yoke 25 carries pairs of spaced arms 30 between each pair of which is supported a brush holding device 31 of the usual or any suitable variety, brushes 32 being arranged in quadrature as well understood in the art, for cooperation with a contact surface 33 of the armature, or in other words, in the present instance with the commutator which is located inside the shaft bearing. The opposite end of the motor frame is closed by a cover plate 34 having a bearing at its periphery on yoke 19 and being fixed thereto by means of screws 35. This plate supports, in compact arrangement, a speed governing mechanism connected with the armature shaft as later described. Yoke 19 is provided with outwardly extending lugs 36 perforated to receive screws or bolts 37 passed downwardly through openings in the cabinet top and threaded into the lugs to support the motor. At the location of these supporting screws 37, the top 16 of the cabinet is formed with cup-shaped depressions 38, the bottoms of which are formed with openings 39 considerably larger than the screws and through which the latter are passed. Cushioning washers 40 of felt or other suitable material are placed between the head of each screw and the cabinet top and a washer 41 is placed between the latter and the lug or bracket of the motor, thus eliminating metal to metal contact between the motor frame and the cabinet. The motor is therefore rigidly supported on the under side of the cabinet top by means preventing the transmission of vibrations from the motor to the cabinet and further insuring quiet operation.

It is particularly desirable in the operation of a sound reproducing machine to provide for uniform rotation of the record table at its adjusted speed. To this end there is combined with the motor a speed governing mechanism driven by the armature shaft and comprising means for restraining or braking its rotation whenever the speed of the armature becomes excessive, as for example, during fluctuations of the applied voltage. To this end cover plate 34 carries upstanding lugs or brackets 42 and 43 formed with bearings for bronze bushings 44 and 45 in which the opposite ends of a spindle 46 are rotatably supported. The bushing 44 is fixed in its bearing 42 as by means of a screw 47, the opposite bushing 45 being free to slide longitudinally in its bearing 43. Spindle 46 is thus arranged to have a small longitudinal movement with its bushing 45 as provided for by an elongated bearing portion or trunnion 48 in the fixed bushing 44. Spindle 46 is formed with or has fixed thereon a worm 49 meshing with a worm-wheel 50 fixed on the armature shaft. The helical angle of the gear means described is selected to afford an efficient driving connection for rotating spindle 46 by the rotation of the armature shaft and this gearing is so designed that the transmission of driving force produces a longitudinal thrust of spindle 46 against its movable bushing 45. Such movement of the bushing, however, is resisted by adjustable resilient means comprising, preferably, a coil spring 51 supported between the end of the bushing and the adjacent end of a screw 52 threadedly supported in a lug or bracket 53 on plate 34. The screw is provided with an adjusting finger-piece 54 by means of which the degree of resistance to the end thrust of the governor spindle may be regulated.

The endwise thrusting movement of spindle 46 is utilized to apply a brake for restraining its rotation and that of the armature. To improve the effective action of this means, however, it is desirable to provide a slight resistance to the rotation of the spindle during the normal operation of the machine in order to produce a sufficient driving force between the armature shaft and the spindle to afford at all times the condition of some end thrust in the spindle. In other words, the operating load, in a machine of this type, being very small, if the force transmitted to spindle 46 is practically nothing, as it may be, the sudden acceleration of the armature and of the spindle might not produce sufficient end thrust in the latter because of its lack of resistance to move it in its bearings and apply the brake. At the same time it is desirable to provide for starting the motor from its state of rest without any braking action whatever, in order that it may not draw too large a starting current. It has been found that these various requirements may be satisfactorily met by supplying spindle 46 with a speed responsive controller, in the present instance of the centrifugal type, for applying a small braking resistance to the spindle as it is speeded up to its normal rate of rotation during the operation of the machine.

Figure 6:
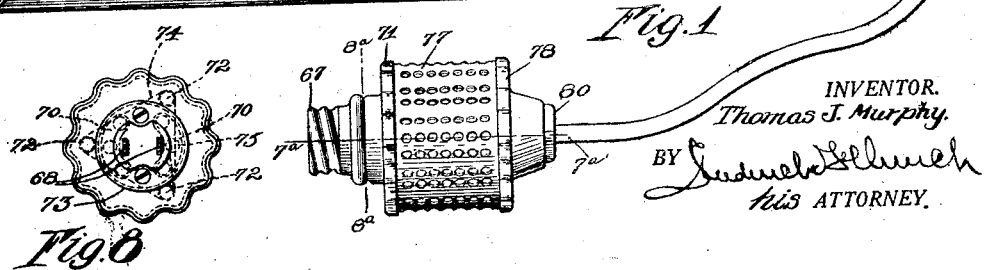
Figure 6 is a section on the line 6ª—6ª of Figure 2 showing a speed governing mechanism.

To this end spindle 46 carries a sleeve 56 of substantial bearing length which slides longitudinally on the spindle and has fixed thereto at its outer end a brake disc 57. Spindle 46 has fixed thereon, adjacent worm 49, a collar 58, and a plurality of resilient metal strips 59, weighted as at 60, are fixed at one end to collar 58 and at the other to sleeve 56. This means provides a centrifugal speed responsive controller operating as the spindle is rotated to slide sleeve 56 on the spindle and move disc 57 into engagement with an adjustable brake finger 61 presently to be described. It is to be noted also that longitudinal movement of the spindle likewise serves to produce a braking movement of disc 57. Thus when the motor is stationary, spring 51 holds the spindle in its right hand position, Figure 6, and the speed responsive controller permits sleeve 56 to occupy its extreme right hand position on the spindle so that the motor may be started without any braking action. After the motor is started, however, the controller comes into operation to move sleeve 56 toward the left on the spindle, the parts being so adjusted and arranged that a slight braking action is produced at normal operating speeds of the machine. This provides for a certain amount of constant end thrust of spindle 46 against its spring 51 so that these parts have a sensitive, floating or balanced relation at the normal operating speeds regulated by the adjustment of brake finger 61 by the manual means presently described. When the motor tends to speed up, however as with an increase in a fluctuating voltage, the tendency too of the force transmitted to spindle 46 on this account to increase, produces an endwise movement of the spindle which immediately brings the braking parts into action, thus restraining the rotation of the spindle before it has had time to become accelerated to any appreciable extent. The action of the governor as a whole therefor is more sensitive and prompt than centrifugal or inertia governors which depend upon an actual increase in speed to operate them, whereas in the present mechanism it is the transmission itself of the accelerating force which applies restraint before the speed of the driven parts is appreciably increased.

Figure 1:
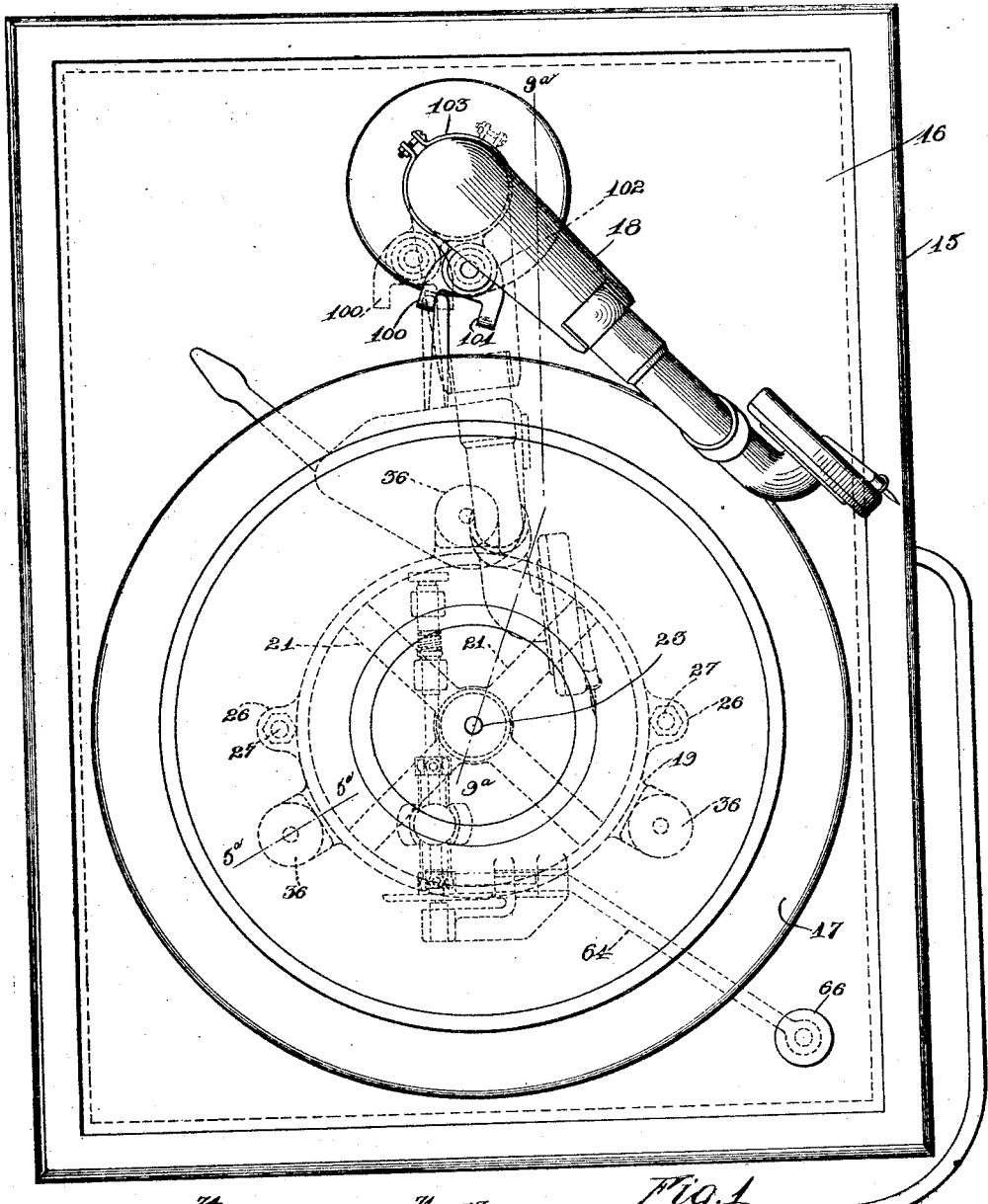
Figure 1 is a top plan view of a sound reproducing machine embodying the present invention.

Brake finger 61 is supported in the end 62 of an arm 63 carried by a rod 64 rotating in a bearing 65 on the motor cover plate 34. Rod 64, as shown in Figure 1, is extended angularly below the top 16 of the cabinet to one side of the record table where it is engaged by the end of a manual adjusting screw 66 threadedly supported by and extending through the cabinet top as well understood in the art.

The action of the governing device already described is supplemented by a current regulator in the supply line of the motor, operating during increases of the applied voltage to choke off corresponding tendencies of the current to increase. This regulating means is shown in Figures 7 and 8 as comprising a screw plug 67 adapted for insertion in a standard supply socket and provided with the usual conducting strips or bayonets 68. A block 69 of insulating material is formed for detachable connection with the plug by the usual openings or slots arranged to receive the spring conductors 68. Secured on the side of the block opposite the plug, by means of screws or otherwise, are contact plates 70 arranged for engagement with the plug conductors, as well understood in the art. The block also supports a circular sheet metal end plate 71 carrying spaced posts 72, three in number in the present instance, the upper ends of the posts supporting an annular plate 73. These posts form a frame on which is stretched or coiled a length of nickel wire 74 which has a high positive coefficient of resistance, one end of the wire being connected with one of the plates 70 and the other with a binding post 75 carried by the plate 73. The other conducting plate 70 is connected directly with a second binding post 76 on plate 73 by a wire 76$^a$, these binding posts being insulated from the plate and providing means for connection with the motor circuit. The element 74 is thus arranged for connection in series in one side of the supply line and as its resistance increases with increase in the current it tends to automatically correct voltage fluctuations. The element develops heat, of course, during such operation and it is therefore preferred to support on the periphery of plate 71 a substantially cylindrical casing wall 77 of fiber or other heat resisting and insulating material. The wall is corrugated as shown in Figure 8 and provided with perforations, especially at its inwardly extending portions, to afford heat dissipating ventilation for the resistance element. The opposite end of the casing wall 77 supports a closure 78 secured as by means of screws 79 to plate 73, the closure having also an eye 80 of insulating material through which the supply circuit wires are inserted. The end closures of the casing are corrugated to correspond with the side walls so that the ventilation is not shut off by the proximity of the surfaces of other objects to the casing. This resistance device, by reason of its high positive coefficient, effectively resists increases of current, and in conjunction with the speed governing mechanism affords operation of the motor at a high degree of uniformity in speed substantially independent of considerable fluctuations in the impressed voltage.

The above described apparatus has combined therewith also an automatic stop mechanism for opening the motor circuit when the reproduction of a record is completed and thereby stopping the operation of the machine. This mechanism comprises preferably, a sheet metal housing 81 located on the top of the cabinet under the record table 17 and adjacent the point of support of the tone arm. Within this housing is a block 82 of insulating material having sockets 83 for the reception of conductors 84 forming one side of the motor circuit. Fixed on this block in electrical contact with one wire 84 is a spring contact 85 restrained by a rigid stop plate 86. Block 82 carries also a flexible plate 87 in contact with the other wire 84 which plate may be flexed into contact with the yielding plate 85 for establishing connection between conductors 84. Contact 87 is formed with lateral ears 88 between which is pivoted one end of a link 89 of insulating material the opposite end of which is pivotally connected with a link 90 pivotally supported at its other end on a pin 91 carried by the housing. Links 89 and 90 thus form a toggle joint which when straightened forces contact 87 into engagement with contact 85. A stop 92 is formed on the casing to hold the links substantially in alignment with each other, in which position they tend to remain after adjustment, to hold the switch contacts closed, as shown in Figure 10, and means are provided for breaking the toggle by moving the point of pivotal connection of the links in the opposite direction to allow contact 87 to disengage contact 85. Movement of the toggle links in this direction is limited by a stop 93.

The toggle links may be set to the position shown by manual means including a lever 94 pivotally supported on pin 91 and having a finger 95 engaging in an opening in link 90, in addition to which the links may be operated automatically by the end 96 and a bell crank lever 97 pivotally supported on the casing and having an end 98 extending through a side wall of the latter. The casing has a stop lug 99 engaging loosely in an opening in the arm 96 of the lever, so that the latter has but a slight movement sufficient for tripping the switch holding means or links. Arm 98, as stated, extends adjacent the tone arm and between spaced abutments 100 and 101 of an angular clip or yoke 102 which is pivotally supported on a ring 103 clamped to the base of the tone arm. The pivotal connection between the yoke and ring is such as to permit, but frictionally restrain, pivotal movement of the yoke on the ring when the abutments of the yoke are brought into engagement with the tripping lever arm 98.

It is evident from the above description that the tone arm may be swung to the position shown in Figure 1, or in other words with its reproducing needle adjacent the outer edge of the record table, to thereby bring abutment 100 of the yoke into positioning engagement with arm 98 the movement of which is restrained by its stop 99. This serves to position or swing the yoke on its pivot to a position beyond that required for tripping operation of the arm with any record of usual dimensions. The arm is then swung inwardly of the record until the needle is brought to the position on the record on which it is desired to stop the operation of the machine. This latter movement brings the opposite abutment 101 into engagement with tripping arm 98 which is thereby moved to its precise tripping position and correspondingly sets the yoke 102 on the tone arm. The machine having been started, with the tripping device in switch closing position, as the reproducing needle reaches the end of a record, yoke abutment 101 actuates the tripping arm 98 and opens the motor circuit by the means described. The construction and arrangement of these parts is such as to eliminate lost motion and slippage or "creeping" of the stop mechanism after adjustment and thus insures positive and precise stopping of the machine at the desired point. It is also to be noted that the switch contacts are opened by a snap action of spring plate 87, thus decreasing sparking at the contacts.

As the operation of the apparatus has been explained in detail in connection with the description of its construction, further explanation thereof appears unnecessary. The simple but rigid construction of the motor, the cushioned attachment of the same to the cabinet, and the direct connection of the armature shaft with the record table insure silent operation of the machine. The sensitive speed governing mechanism provides for the starting of the motor without load and automatically applies after starting, a slight frictional resistance facilitating the operation of the governor spindle which acts sensitively and quickly to restrain fluctuations in speed. The current regulating resistance cooperating with the speed governing mechanism further provides for a high degree of uniformity in speed under considerable fluctuations of the impressed voltage. The operation of the motor is terminated by the described stop mechanism which is quickly and conveniently adjusted to any given record by simple swinging movement back and forth of the tone arm and this mechanism terminates the operation of the machine in a precise and reliable manner by the efficient operation of the switch controlling the motor circuit.

I claim as my invention:

1. In an electric machine, the combination with an armature and a shaft therefor, of a supporting frame comprising a substantially ring-shaped part provided with spaced elements extending from one side thereof longitudinally of said shaft and supporting a shaft bearing at their opposite ends, a second ring-shaped part embracing said elements and provided with brush holders extending between said elements for engagement with a contact surface on said armature, a field core embracing said elements between said ring-shaped parts, means connecting the latter in clamping engagement with said field core, and a member detachably secured on the other side of said first ring-shaped part having a second bearing for said shaft.

2. In an electric machine, the combination with an armature and a shaft therefor, of a supporting frame comprising a yoke adapted to be passed over the armature, spaced ribs extending from one side of said yoke longitudinally of and enclosing the armature and converging at their opposite ends to provide a bearing for said shaft, a second yoke embracing said ribs and having brush holders extending between the latter for engagement with a contact surface on said armature, field laminations embracing said ribs between said yokes, means for forcing said yokes into clamping engagement with said laminations, and a plate detachably secured on the other side of said first yoke and formed with a second bearing for said shaft.

3. In an electric machine, the combination with an armature and a shaft therefor, of a supporting frame comprising a yoke enclosing the armature, spaced ribs extending from one side of said yoke longitudinally of the armature and enclosing the same, a bearing for one end of the shaft supported by said ribs, a second yoke embracing said ribs and having brush holders extending between the latter for engagement with a contact surface on the armature, a field core supported on the ribs between the yokes, means for forcing said yokes into clamping engagement with said core, a speed governing device for the armature shaft and a member detachably secured on the other side of said first yoke provided with supporting means for said governing device and with a second bearing for said shaft.

THOMAS J. MURPHY.